Figure 1:
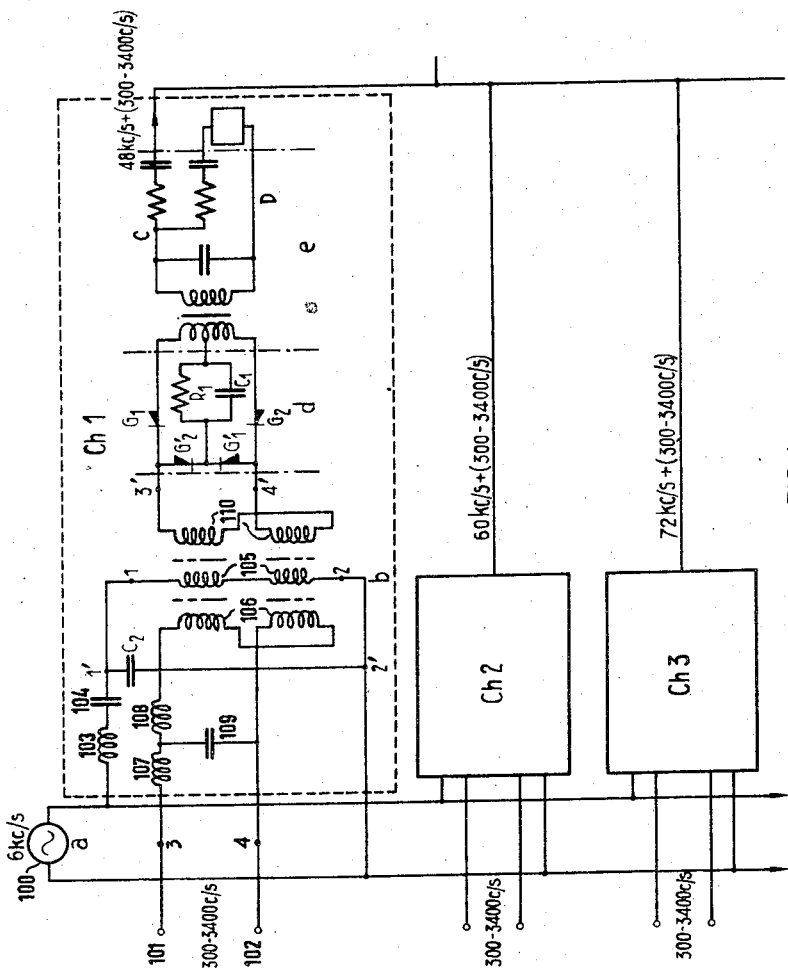

INVENTOR.
Paul Alexander van Deinse

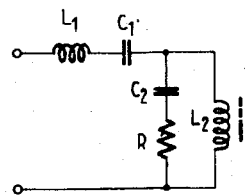
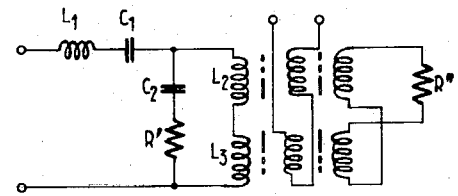
FIG. 8  FIG. 9
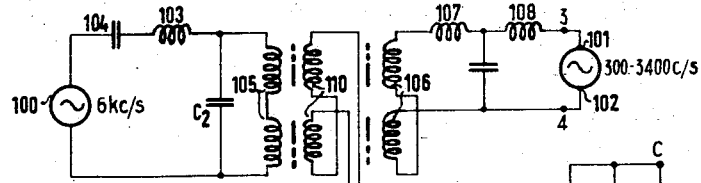
FIG. 10
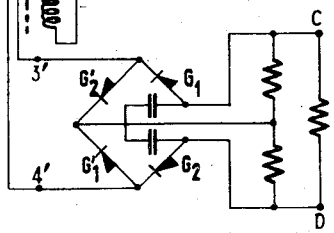
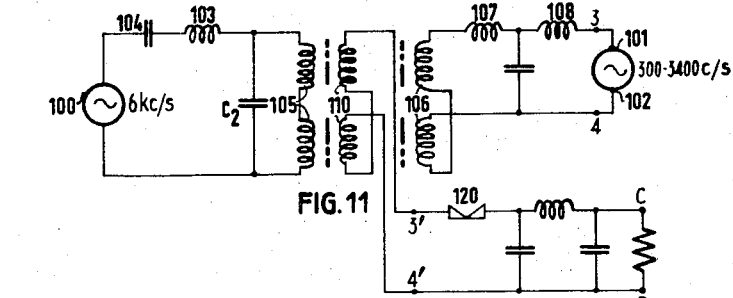
FIG. 11
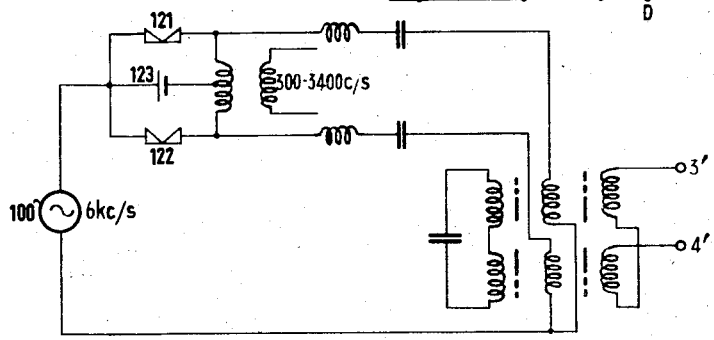
FIG. 12
INVENTOR.
Paul Alexander van Deinse April 28, 1959 P. A. VAN DEINSE 2,884,599
MAGNETIC MODULATOR Filed Nov. 27, 1953 5 Sheets-Sheet 4

INVENTOR.
Paul Alexander van Deinse
BY
Attys

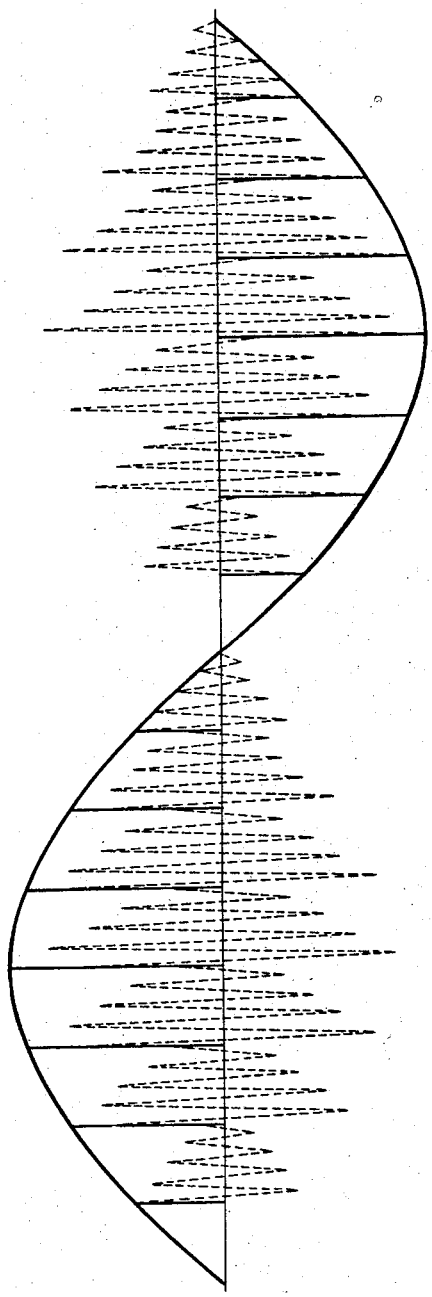

United States Patent Office

2,884,599
Patented Apr. 28, 1959

2,884,599

MAGNETIC MODULATOR

Paul Alexander van Deinse, Voorburg, Netherlands, assignor to Staatsbedrijf der Posterijen, Telegrafie en Telefonie, The Hague, Netherlands Application November 27, 1953, Serial No. 394,847

Claims priority, application Netherlands December 1, 1952

17 Claims. (Cl. 332—51)

The invention refers to a magnetic modulator, in which all energy contributions present in the side bands of all harmonics together are transferred, by means of a frequency-independent non-linear element, to the two-side bands of one given harmonic, these two side bands being optionally divisional with the aid of a division filter.

It is well-known to excite harmonics with the aid of non-linear inductance coils (cf. Bell System Technical Journal 1937, page 437 ff.). The name "singing coil" has been given to such coil circuit.

By combining two such circuits in the manner in which two transformers are often combined into a magnetic amplifier, a magnetic modulator may be built, in which the higher harmonics are modulated by a control current.

In the invention the energy contributions of all higher harmonics are bundled by means of a frequency-independent non-linear element into the energy of one higher harmonic, the purpose being to obtain higher gain without feedback and therefore, without danger of instability.

In magnetic amplifiers it is well-known that the energy amplification increases proportionally with the carrier frequency. By utilizing a higher harmonic generator this effect is the better made use of with increased order of the harmonic. By subsequently bundling the energy contributions of all higher harmonics into one single higher harmonic the inventor has obtained magnetic modulators with high energy gain suitable for a large range of frequencies.

In magnetic modulators positive feedback is often used with an increase of gain, but at the cost of instability and a reduction in bandwidth. The above circuit is free from these drawbacks.

In known magnetic modulators energy is often taken from the secondary side, the products being modulated and the signal being of the form $(1+\cos pt)$ or $(1+\sin pt)$; the value 1 indicates that no modulation products may be obtained without carrier (cf. Proc. I.R.E. March 1951).

In the circuit of the invention carrier suppressed modulation is used.

In known modulation systems every carrier derived from the common carrier oscillator is separately filtered before being fed to the modulator. In the system of the invention no separate filters before the modulator are necessary.

In accordance with the present invention a magnetic modulator comprises means for producing the modulation products of the harmonics of an energizing sinusoidal signal of known frequency and a control signal, which in the preferred embodiment, may be the voice frequency current of a telephone conversation. The means for producing the modulation products may comprise a pair of coils wound on a saturable core, one of the coils carrying the energizing signal and the other coil carrying the control signal. The saturable core device generates harmonics of the sinusoidal signal and modulates these harmonics with the control signal. As a precaution one of the pair of coils is wound in series opposing manner to prevent induction currents from the other coil from affecting that coil in the absence of a signal. In the preferred embodiment the coil carrying the control circuit is wound in series opposing manner for this purpose.

An output coil is wound around the saturable core so as to carry an induced signal comprising the harmonics of the energizing signal modulated by the control or voice frequency signal. The induced signal is applied to a frequency converter comprising a full wave rectifier and a chargeable isolating circuit which serves to prevent the attenuation of the voltage peaks of the harmonics between voltage peaks.

An output circuit comprising a filter tuned to a particular harmonic of the energizing signal cooperates with the rectifier circuit and the chargeable isolating circuit to concentrate the energy stored in the sidebands of the harmonics in the sidebands of one higher harmonic of the energizing signal. If for example, the filter circuit is tuned to the twelfth harmonic of the energizing signal, then the energy stored in the second, third, fourth and sixth harmonics is concentrated in this single harmonic.

In modulating the harmonics of the energizing signal, the control signal reverses the phase of the harmonics once each cycle of the control signal and with the use of a full wave rectifier circuit coupled to a center tapped transformer in the frequency converter, the energy transferred to the output filter circuit is increased. The utilization of this phase reversal of the harmonics by means of the control signal permits a simplification of the frequency converter over prior art structures. Also, since the current flowing through the output windings of the transductor has a component in the direction of the voltage peaks it aids in the premagnetization of the saturable core. The increase in premagnetization increases the height of the peaks of the harmonic voltage resulting in the transfer of more energy to the output filter circuit.

Figure 2:
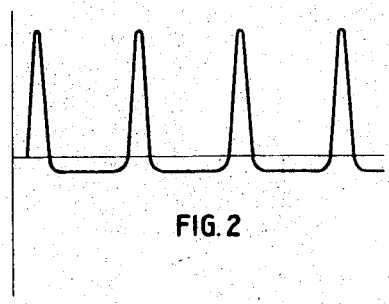
Figure 3:
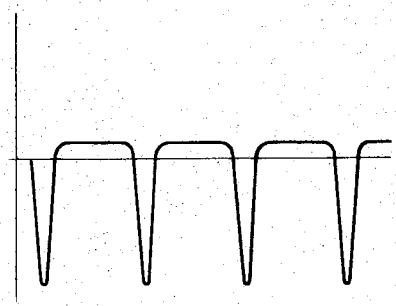
Figure 4:
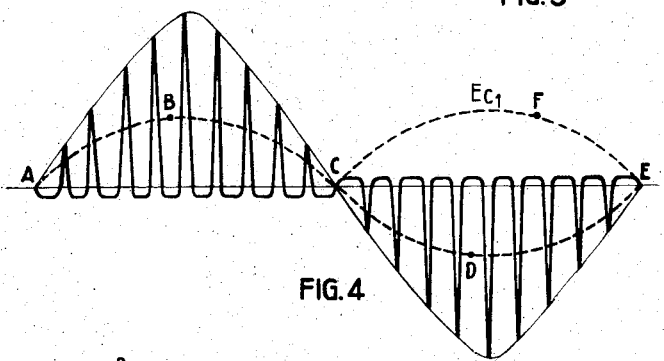
Figure 5:
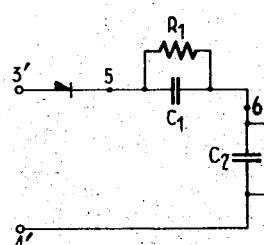
Figure 6:
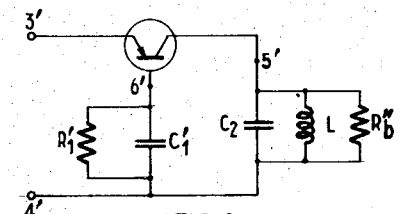
Figure 7:
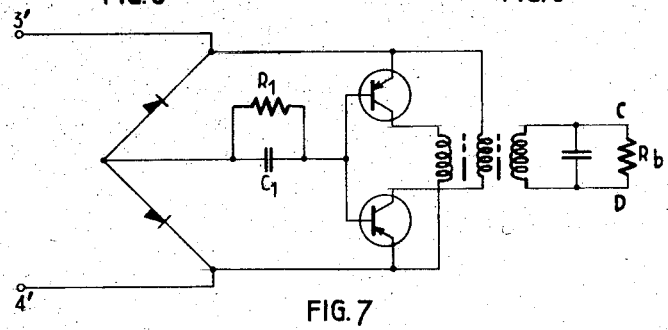

In explanation and by way of example a carrier system for telephony will be described incorporating the features of the invention, the drawings showing in:

Fig. 1 the transmitting part of a carrier telephone system for 3 channels;

Fig. 2 the voltage curves occurring at the output of the transductor under the control of a D.C. voltage;

Fig. 3 the voltage curves at the transductor output under the control of a D.C. voltage of opposite polarity to that of Fig. 2;

Fig. 4 a voltage at the transductor output under the control of a single tone frequency;

Fig. 5 an example of an isolating circuit between transductor and load;

Figs. 6 and 7, a circuit similar to that shown in Figure 5 which includes a transistor isolating circuit;

Fig. 8 a diagram of a "singing coil";

Fig. 9 a diagram of the combination of two singing coils;

Figs. 10 and 11 the diagram of a complete modulator circuit;

Fig. 12 a diagram of a modulator circuit for odd harmonics;

Figures 13, 15 and 17–19, circuit arrangements illustrating the operation of the novel unit of the present invention as a magnetic modulator;

Figures 14, 16, 20 and 21, are graphical representations of the potential forms at various stages of the circuits of Figures 13, 15 and 17–19; and Figure 22 is a graphical representation of the output signal of the embodiment of Figure 1.

In Figure 1 the letter $a$ indicates a generator 100 having a frequency of 6 kc./s. serving as a source for a multiplicity of carrier telephone channels for supplying the various carriers, although other frequencies may be used in the manner known to those skilled in the art.

Three of these channels have been shown, only the first completely, the remaining channels functioning similarly with the exception that a different harmonic is selected from the energy source. Moreover, the control signal for every channel is formed by a telephone conversation comprising frequencies from 300 c./s. to 3400 c./s. and applied to terminals 101 and 102.

In series with the 6 kc./s. supply 100, a series resonant circuit comprising an inductance 103 and condenser 104 is provided to ensure a correct sinusoidal shape of the current fed to a magnetic amplifier (b) and in order to prevent retroaction.

In parallel to the windings 105 connected between the points 1 and 2 a condenser C2 is provided between the points 1' and 2', this condenser extending the production of harmonics into the range of higher harmonics and being similar to condenser C2 in Fig. 1 page 439 and Fig. 6 page 444, Bell System Techn. Journal 1937; an essential difference being however that in the invention the condenser C2 is provided across the two saturable coils 105, whereas in the Bell System it is provided across one single coil. In this Bell circuit the condenser is provided exclusively in order to produce an increased number of high harmonics, whereas in the invention condenser C2 (Figs. 1 and 2) moreover has a function in modulation. Fig. 8 shows the Bell circuit, Figure 9 the circuit of the invention.

With respect to Figure 8, in the periods, in which coil L2 is not saturated, condenser C2 is charged. At the attainment of saturation for L2 however the voltage across L2 will decrease and C2 will discharge through L2, still further increasing the latter's saturation. The condenser energy is now dissipated in resistance R.

In the absence of pre-magnetization the situation in the circuit of Fig. 9 is essentially the same as that of Figure 8. In the periods that the two coils L2 and L3 are not saturated, condenser C2 is charged. As soon as the coils approach saturation their voltages will decrease, so that C2 may now discharge through the coils L2 and L3, these being carried further into the saturation range. The condenser energy is now dissipated in resistance R'. If, however, one of the coils reaches saturation before the other, part of the condenser energy will be dissipated in resistance R'', instead of in resistance R', the non-saturated coil still functioning for some time as a transformer. Thus this circuit differs essentially from the normal magnetic modulator without condenser or with series resonating circuits (cf. Manley in the Proc. I.R.E. of 1951, pages 242–251), as in the circuit of the invention the maximum available energy may be dissipated even without premagnetization. In normal magnetic modulators the energy dissipation in the singing coil is substantially zero in such case.

The transductor windings 106 connected between points 3 and 4 (Fig. 1) and to which the control signal is to be supplied are so series connected, that voltages excited in both windings by induction cancel out in the absence of a signal, so that no corresponding signals occur between terminals 3 and 4.

Moreover, two inductances 107 and 108 in series and the condenser 109 in parallel have been inserted in the supply lines of points 3 to 4 with the object of preventing feedback reaction of the generated harmonics into the source of the control signal (in the presence of such signal there is a voltage between 3 and 4). The transductor windings 110 between terminals 3' and 4' are connected in the same sense as the windings between terminals 3 and 4. It is well-known that the provision of a D.C. source between terminals 3 and 4 would result in a voltage between terminals 3' and 4' of the shape of Figure 2. On inverting the D.C. polarity the shape would change to that of Figure 3 (see Wireless Engineer, September 1951, R. Feinberg, Even Harmonic Modulation Theory. This article, however, does not mention condenser C2 as an aid to promote the harmonic excitation). The height of the voltage peaks in Figure 3 is, moreover, determined by a value of the D.C. voltage supplied (i.e. by the value of the premagnetization).

The curve shape indicates that several higher harmonics of the basic frequency will be produced.

Moreover, it is known that the circuit shown in Figure 1 produces exclusively even harmonics. If now the D.C. source between terminals 3 and 4 is replaced by a single low frequency sinusoidal voltage the voltage between terminals 3' and 4' will change to that of Figure 4, the envelope reproducing the voltage supplied.

If now between terminals 3 and 4 a telephone conversation is connected, voltages will occur as represented in Figure 4, the envelope now containing the entire low-frequency conversation signal. The carrier frequency in every channel is determined by filter e, whereas rectifier circuit d together with the transformer and condenser in the first mesh of filter e takes care of the bundling of the energy of all higher harmonics in the side bands of any of the harmonics.

At the moments in which voltage peaks occur the rectifier circuit will have a low resistance and its current as well as the current in the filter load will increase. Now the height of the voltage peaks is proportional to the premagnetization, so that the current will also have a component in the direction of the voltage peaks increasing with premagnetization.

On inversion of the voltage the current will also invert. Condenser C1 together with resistance R1 (rectifier circuit d of Figure 1) will take part of the voltage. It serves to prevent the attenuation of the voltage at the filter entrance during the dying out period by a current via G1 and G1', during the time that the voltage across 3' and 4' is zero, as more fully discussed hereinafter. The condenser voltage has been shown for the case of Figure 4 by a dotted line in this Figure 21. In a way the energy is directed to the filter.

Filter e serves the same purposes, as, for instance, a filter (a tuned circuit) provided in the plate circuit of a transmitting tube operating in C-adjustment. In this case also current peaks occur in the plate circuit which deviate strongly from the sinusoid. In Radio Engineers' Handbook by F. E. Terman, first edition, page 459, it is stated that "The shorter the length of current pulses in the case of a particular harmonic the higher will be the plate efficiency." For the calculation of the useful power of a pulse circuit the following remarks may be useful (cf. the section entitled: "Calculation of the Output Energy of a Pulse Circuit," which appears hereinafter). At the filter output a large part of the energy supplied by the 6 kc./s. generator is under the control of the conversation signal in the transductor stored in the two side-bands, practically no carrier energy being lost.

With reference to Figure 22 there is shown thereat the output signal which appears across terminals C and D when the magnetic modulator is used as a carrier-current transmitter in which the voice frequency intelligence signal is modulated with a preselected harmonic of the energizing or sinusoidal signal from generator 100. The heavy vertical lines of Figure 22 are representative of the pulses appearing at terminals 3' and 4' of Figure 1 (compare Figure 4). The dash lines of Figure 2 represent a voltage appearing at terminals C and D, and the envelope of the modulated signal corresponds to the voice frequency intelligence characteristic of the control signal.

As already stated losses still occur in condenser C1 and resistor R1. This RC circuit was provided with the object of a good separation between the input circuit and the output circuit of the rectifier circuit. The loss may still be materially reduced by using transistors in the rectifying circuit.

With reference to Figures 5 and 6 there is therein illustrated the development of a circuit having less power dissipated in the RC isolating circuit than that of Figure 1. Suppose that in Figure 5, $R_1=2R_b$ (see the section entitled: "Calculation of the Output Energy of a Pulse Circuit," which appears hereinafter) then the voltage across $C_1$, $E_{c1}$ will be $E_{c1}=\frac{1}{2}E$. The point 6 will then oscillate about a mean value of zero volts with decreasing amplitude with respect to 4' starting from the value $\frac{1}{2}E$. As point 5 will continuously be $\frac{1}{2}E$ higher the voltage at this point will vary from E to O, so that 5 will only become negative at the short instants in which 3' is at a peak value, so that across point 5 the condenser circuit may be fed with proper energy pulses.

In this case at most half the voltage will be available for the filter circuit, which amounts to a loss of 3 db as the pulse current remains the same.

In Fig. 6 the situation is entirely different. The voltage at the point 5' here varies from somewhere below +E to a voltage slightly over −E, point 6' being slightly lower than +E. If now 3' has also reached +E, the transistor has become conductive because 3' will be at a higher potential than 6' and current will flow to 5'. The power applied to the circuit between 4' and 5' is about equal to the power in the circuit of Figure 5 between these points, but the power in Figure 5 destroyed in $R_b$ is only about 50% of that absorbed in Figure 6 in $R_b''$. The current which must keep the voltage across a condenser and therefore the voltage at point 6' at its proper value may be much smaller in the case of Figure 6. The entire rectifier circuit is shown in Figure 7.

Fig. 10 shows a circuit in which amplification may be obtained. If for instance a voltage is supplied to terminals 3 and 4, a corresponding low frequency signal may be taken off at points D and C. The non-linear elements in this case are rectifier cells.

Fig. 11 shows a similar circuit but uses voltage dependent resistances 120 as non-linear elements.

More specifically, if a unidirectional voltage source is coupled to terminals 3 and 4 of Figure 10 or 11 in such a manner that terminal 3 is connected to the positive side of this source and terminal 4 is connected to its negative side, there will appear across terminal points 3' and 4' a pulse voltage, such as that illustrated in Figure 2. This pulse voltage at points 3' and 4' causes a unidirectional voltage across the output between terminals C and D, in which point C is positive and point D is negative.

If, however, a source of unidirectional potential is coupled to terminals 3 and 4 so that the positive side is connected to terminal 4 and the negative side is connected to terminal 3, there will appear at terminals 3' and 4' a pulsed voltage such as that illustrated in Figure 3. This pulsed voltage generates a direct current voltage across terminals C and D of such polarity that point C is negative and D is positive.

If now a low frequency alternating voltage is applied to terminals 3 and 4 in either Figure 10 or 11, there will appear at terminals 3' and 4' a pulsed voltage such as that illustrated in Figure 4. The envelope of the pulsed voltage of Figure 4 is representative of the low frequency signal applied to terminals 3 and 4. The corresponding pulsed voltage occurring at terminals 3' and 4' generates the voltage, such as that illustrated by the curve ABCDE of Figure 4 across the load connected between terminals C and D. Consequently, Figures 10 and 11 are illustrative of specific embodiments of the present invention employed as an amplifier.

If it is desired to utilize the magnetic modulator of the present invention as a receiver in a carrier-current telephone system, a band pass filter may be substituted for the one connected to terminals 3 and 4 of either Figure 10 or 11. Frequencies other than those within the band pass characteristic of the filter are greatly attenuated and do not further appear in the system from this source. As a specific example, for a band pass filter designed to pass a band of frequencies such as;

48 kc./s.+(300–3400 c./s.)− the embodiment illustrated in Figure 10 or 11 acts as a demodulator utilizing the eighth harmonic of the sinusoidal signal source 100 to produce an audio signal having frequencies in the band 300–3400 c./s. at output terminals C and D.

As an alternative arrangement a D.C. voltage may be generated at output terminals C and D, if an alternating voltage having a frequency equal to a even multiple of the fundamental frequency of source 100 is applied to terminals 3 and 4 in either Figure 10 or 11.

Specifically, if the voltage having a frequency of 48 kc./s. is applied to terminals 3 and 4, a direct current voltage appears at output terminals C and D.

This latter alternative may be desirable when it is desired to monitor a tone and energize an alarm system upon its interruption.

By designing filters following the points 3 and 4 in Figure 1 in a different manner i.e. by placing the frequency band which they pass not between 300 cycles per second and 3400 cycles per second but at $2n$ (6 kc.+300 to 3400 cycles per second), $n$ being an arbitrary integer (and by supplying corresponding frequencies) voltage peaks will occur at terminals 3 an'd 4' which correspond to those occurring if a range from 300 cycles to 3400 cycles is supplied. In this manner it would be possible to construct a magnetic modulator in which the control signal has a higher frequency than the energy frequency. As the phenomena at the output terminals 3' and 4' do not thereby change we may select any desired frequency at the output. If we take a low frequency output we would have demodulation; if we choose the same frequency as the signal energy, we have an amplifier at that frequency. If in the latter case we carry back part of the output energy to the input, we may obtain a generator if proper account is taken of the phase. With a filter in the feedback circuit the oscillator frequency may then be made independent of the energy source frequency.

From a 50 cycle per second source we might in this manner take, for example, a signal of 260 cyles per second; the supply voltage might vary between 48 and 52 cycles per second. The frequency might be arbitrarily raised to an even or odd multiple to serve as a supply for a demodulator which might convert radio frequencies into audible ones.

For radio applications the input filter would have to be very sharp in order to suppress the mirror and other spurious frequencies.

The circuit of Figure 12 also serves to excite with the aid of singing coils odd harmonics of the energy frequency and to modulate them. By polarizing the voltage dependent elements 121 and 122 with a unidirectional potential from source 123 their impedances will change and correspondingly the phases of the currents through the two singing coils. This dissymmetry will have as a consequence that one coil will always be saturated first, the pulses at terminals 3' and 4' being thereby alternately of positive and negative sign.

*Calculation of the output energy of a pulse circuit*

Figure 13:
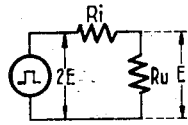
Figure 14:
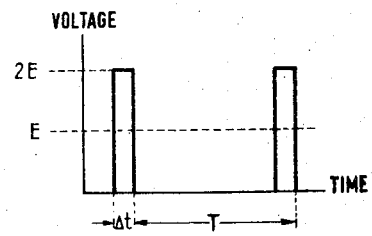

We start from the circuit of Figure 13 in which the generator supplies a voltage of the shape of Figure 14; the largest power will in case of real impedance $Ri$ be supplied to $Ru$ if $Ri=Ru$. In this case during the time the generating voltage is at $2E$ the voltage across $Ru$ will be E. The generator produces in each period a power:

$$P_{gen}=\frac{1}{T}\int_0^T \frac{(2E)^2}{Ri+Ru}dt=\frac{\Delta t}{T}\frac{4E^2}{2Ru}=\frac{2\Delta t}{T}\frac{E^2}{Ru}$$

The power in $Ru$ is:

$$P_{Ru}=\frac{1}{T}\int_0^T \frac{E^2}{Ru}dt=\frac{\Delta t}{T}\frac{E^2}{Ru}=\frac{P_{gen}}{2}$$

If we put $$\frac{E}{Ru}=I$$

we may also put $P_{Ru}$ as follows $$R_{Ru} = \frac{\Delta t}{T} EI$$

As the load is real throughout cos $\varphi = 1$.
The current I may also be put as $$\frac{2E-E}{Ri}$$

Figure 15:
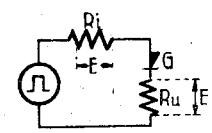
Figure 16:
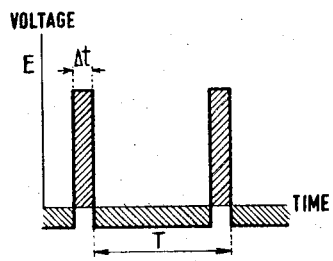

In Fig. 15 an ideal rectifier G is shown. During the interval in which current flows it is a short circuit and during the remainder of the period it acts as a complete block, as the current is zero anyhow. If the generator supplies a voltage of mean value the power during the time $\Delta t$ of the voltage peak will be $$\frac{T}{\Delta t}$$

times the power in the remaining time. By the provision of rectifier G, the latter power will not be able to convert itself. In the case of very sharp peaks the amount will be very small however.

Figure 17:
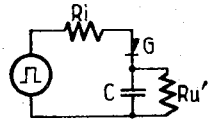

If now in Figure 15, $Ru$ is replaced by the parallel circuit of the very large condenser C and a resistance $$Ru^1 \approx \frac{T}{\Delta t} Ru$$

as shown in Fig. 17, the voltage across $Ru^1$ will remain at E after once having attained this value. The discharge current across $$Ru^1 \approx \frac{E}{\frac{T}{\Delta t}Ru} = \frac{\Delta t}{T} I$$

and the charge current equals $$\frac{2E-E}{Ri} = I$$

The charge per second is $$\frac{\Delta t}{T} I$$

and this is also the amount of the discharge; the condenser voltage therefore does not change.

Figure 18:
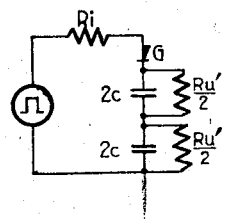
Figure 19:
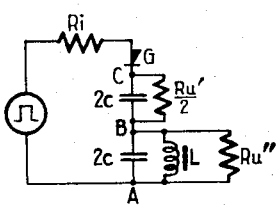

The power per period to $Ru^1$ is $$P^1_{Ru} = E \frac{\Delta t}{T} I = \frac{\Delta t}{T} EI$$

which equals the value for $P_{Ru}$. If C is not infinite the voltage across C will acquire saw tooth shape, as composed of two exponential functions. Then E and I are not constant but the corresponding loss may be kept small by not choosing C too small. Fig. 18 is derived from Figure 17 by halving the capacitive and real impedances and by series connecting two of them. As they are about equal they will both take half the power. In order to obtain Figure 19 from Figure 18 we now replace one of the resistances by a parallel circuit of an inductance and a resistance. L is tuned with 2C to a harmonic of a repetition frequency, whereas $$Ru'' = \frac{Ru'}{4}$$

Figure 20:
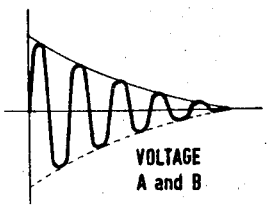
Figure 21:
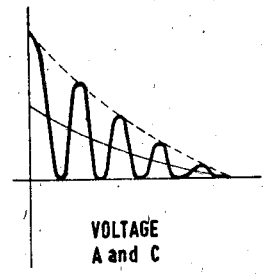

As with this choice of resistances the time constants of the condenser discharge and the decay of the circuit vibrations are equal the voltages across both condensers will be equal during the top of the positive halves of the vibration, cf. Figures 20 and 21. In this case rectifier G will not conduct during the decay in the circuit, so that energy must disappear in the resistances. As the peak voltages across the circuit equal the voltages across the condenser without the coil, the effective voltage across the circuit will be twice as small. If we choose $$Ru'' = \frac{Ru'}{4}$$

the same power will again be supplied to the resistance (the frequency of the harmonic has to be so low that the pulse duration remains small with respect to half the period of the harmonic). Only in this case the sum of the voltages across both condensers may equal E during the pulse duration so that the power supplied to the condensers during this duration will be $$\frac{\Delta t}{T} EI$$

in which $$I = \frac{(2E-E)}{Ri}$$

If now the generator modulates its impulse voltage 2E in amplitude the circuit voltage will do the same, which means that the two side-bands are generated.

In Figures 13 and 15 the voltage across $Ru$ will change with the same amplitude variation. In Fig. 17 the equalized D.C. voltage will change with the same amplitude variation. Here a compromise will be found in the values of the condenser C, as the time constant RC must be smaller than the period of the highest frequency. The time constant should on the other hand be greater than the interval between two voltage peaks, as the voltage across the condensers would have decreased too much and the product EI would become too small by the decrease of E. It is seen that the entire side band power is independent of the harmonic frequency taken on the series, but determined by the RC time of the condenser and resistance and the highest frequency to be passed.

While I have illustrated and described what I regard to be the preferred embodiment of my invention, nevertheless it will be understood that such is merely exemplary and that numerous modifications and rearrangements may be made therein without departing from the essence of the invention, I claim:

1. A magnetic modulator circuit comprising harmonic generator means including a magnetic modulator device operative responsive to receipt of a sinusoidal signal of a predetermined frequency to produce an output signal over an output circuit which include harmonics of said sinusoidal signal, input means for applying control signals to said magnetic modulator for modulating said output signal, and frequency converter means for concentrating the energy stored in the sidebands of certain of said harmonics into the sidebands of a higher harmonic of said sinusoidal signal including a rectifier circuit coupled to said output circuit, an isolating circuit comprising a capacitor and a resistor coupled to the output side of said rectifier circuit to prevent attenuation of the peaks of said harmonics, and a tuned filter circuit including a transformer coupled to the output side of said isolating circuit.

2. A magnetic modulator circuit as set forth in claim 1 which includes means in said tuned filter circuit for providing an output signal having a frequency identical to that of said control signal, to thereby provide an output signal which is an amplified replica of said control signal.

3. A magnetic modulator circuit as set forth in claim 1 which includes means in said tuned filter circuit for providing an output signal having a frequency identical to that of said sinusoidal signal, whereby an output signal which is an amplified replica of said sinusoidal signal is produced.

4. A magnetic modulator circuit as set forth in claim 1 which includes means for providing a control signal comprising the modulation products of a carrier signal of a predetermined frequency higher than that of said sinusoidal frequency and of a modulating signal, and in which the output signal has a lower frequency than that of said control signal, whereby a demodulated signal representative of said modulating signal is produced.

5. A magnetic modulator circuit as set forth in claim 1 which includes means for providing a control signal comprising the modulation products of a carrier signal of a predetermined frequency higher than that of said sinusoidal frequency and of a modulating signal, and in which the output signal has a lower frequency than that of said sinusoidal signal, whereby a demodulated signal representative of said modulating signal is produced.

6. A magnetic modulator as set forth in claim 1 in which said rectifier circuit includes frequency independent non-linear elements coupled to said isolating circuit.

7. A magnetic modulator as set forth in claim 1 in which said rectifier circuit comprises frequency independent non-linear elements, at least one of which is a transistor, coupled to said isolating circuit.

8. A magnetic modulator as set forth in claim 1 in which said rectifier circuit includes frequency independent non-linear elements, said non-linear elements being arranged in the form of a full wave rectifier of the bridge type.

9. A magnetic modulator circuit as set forth in claim 1 which includes a feed back circuit connected to return a part of the output energy in proper phase to the input circuit of said magnetic modulator, whereby an oscillatory circuit is produced.

10. In a signal converter for converting a radio frequency signal comprising modulation products into an unmodulated audio frequency signal, the combination of an oscillator comprising an arrangement as set forth in claim 4 for generating a control signal for use in a magnetic modulator, and a magnetic modulator utilizing said control signal and said radio frequency signal for producing said unmodulated audio frequency signal.

11. In a magnetic modulator: a controlled harmonic generator comprising a first pair of series coupled coils having a saturable core, means for coupling a sinusoidal current to said first pair of coils, a second pair of coils associated with said saturable core and inductively coupled to said first pair of coils; means for coupling a control signal to said second pair of coils, a condenser connected across said first pair of coils for further saturating their core upon its discharge, and a frequency converter coupled to the output side of said harmonic generator comprising a tuned circuit resonant at a preselected harmonic of said sinusoidal current for producing an output signal having energy contributed by certain of the modulated harmonics concentrated in a single sideband determined by said preselect harmonic.

12. A magnetic modulator as set forth in claim 11 in which said frequency converter includes voltage dependent resistances for transferring the energy contributions present in the sidebands of all harmonics from the amplitude modulated pulses to the modulation products with retention of their polarity.

13. A magnetic modulator as set forth in claim 11 in which said frequency converter includes a chargeable isolating circuit having a discharge time constant such that the charge on said isolating circuit remains substantially constant between peaks of said modulated harmonics of said sinusoidal signal.

14. In a magnetic modulator: a controlled harmonic generator comprising a first pair of series coupled coils having a saturable core, means for coupling a sinusoidal current to said first pair of coils, a second pair of coils associated with said saturable core and inductively coupled to said first pair of coils, and a third pair of coils for providing an output signal related to the signals coupled to said first and second pairs of coils; means for coupling a control signal to said second pair of coils, said control signal being of sufficient amplitude to effect premagnetization of said saturable core, a condenser connected across said first pair of coils for further saturating their core upon its discharge, a rectifier circuit including rectifier means and isolating means comprising an RC circuit coupled to said third pair of coils, and a filter circuit coupled to the output side of said rectifier circuit comprising a tuned circuit resonant at a preselected harmonic of said sinusoidal current for producing an output signal having energy contributed by certain of the modulated harmonics concentrated in a single sideband determined by said preselected harmonic.

15. In a magnetic modulator: a controlled harmonic generator comprising a first pair of series coupled coils having a saturable core, means for coupling a sinusoidal current to said first pair of coils, a second pair of coils associated with said saturable core and inductively coupled to said first pair of coils; means for coupling a control signal to said second pair of coils, a condenser connected across said first pair of coils for further saturating their core upon its discharge, an output circuit coupled to said coil pair, and a frequency converter means connected to said output circuit including means for concentrating the energy stored in the sidebands of certain of the modulated harmonics into the sidebands of a single higher harmonic.

16. In a magnetic modulator: a controlled harmonic generator comprising a first pair of series coupled coils having a saturable core, means for coupling a sinusoidal current to said first pair of coils, a second pair of coils associated with said satuable core and inductively coupled to said first pair of coils; means for coupling a control signal to said second pair of coils, said second pair of coils being coupled in a series opposing manner for preventing induced currents from said first pair of coils from affecting said second pair of coils; a first condenser connected across said first pair of coils for further saturating their core upon its discharge, an output circuit for said harmonic generator, and a frequency converter circuit coupled to said output circuit comprising a rectifier utilizing frequency independent non-linear elements for producing a charging current, at least one of said non-linear elements being a transistor, a second condenser coupled to said rectifier and chargeable to a preselected potential with said charging current, and a tuned resonant circuit coupled to the output side of said rectifier circuit and resonant at a preselected harmonic of said sinusoidal current, said second condenser and said tuned circuit cooperating to produce an output signal having energy contributed by said control and sinusoidal signals concentrated in a single sideband determined by said harmonic.

17. In a magnetic modulator: a controlled harmonic generator comprising a first pair of series coupled coils having a saturable core, means for coupling a sinusoidal current to said first pair of coils, a second pair of coils associated with said saturable core and inductively coupled to said first pair of coils; means for coupling a control signal to said second pair of coils, said second pair of coils being coupled in a series opposing manner for preventing induced currents from said first pair of coils from affecting said second pair of coils; a first condenser connected across said first pair of coils for further saturating their core upon its discharge, a frequency converter comprising a rectifier utilizing frequency independent non-linear elements for producing a charging current, said frequency independent non-linear elements being arranged in the form of a full-wave rectifier of the bridge type in which at least one of the non-linear elements is a transistor, a second condenser coupled to said rectifier and chargeable to a preselected potential with said charging current, and a tuned resonant circuit coupled to said second condenser and resonant at a preselected harmonic of said sinusoidal current, said second condenser and said tuned circuit cooperating to produce an output signal having energy contributed by said control and sinusoidal signals concentrated in a single sideband determined by said harmonic.

References Cited in the file of this patent

UNITED STATES PATENTS

| | | |
|---|---|---|
| 2,020,409 | Green | Nov. 12, 1935 |
| 2,164,383 | Burton | July 4, 1939 |
| 2,418,116 | Grieg | Apr. 1, 1947 |